United States Patent [19]

Asanuma et al.

[11] Patent Number: 5,637,367
[45] Date of Patent: Jun. 10, 1997

[54] TRANSPARENT IMPACT-RESISTANT MOLDED ARTICLES

[75] Inventors: Tadashi Asanuma, Takaishi; Tateyo Sasaki, Kishiwada; Shosuke Nakanishi, Takaishi; Takeo Inoue, Kawachinagano, all of Japan

[73] Assignee: Mitsui Toatsu Chemicals, Inc., Tokyo, Japan

[21] Appl. No.: 124,531

[22] Filed: Sep. 22, 1993

Related U.S. Application Data

[63] Continuation of Ser. No. 831,519, Feb. 5, 1992, abandoned.

[30] Foreign Application Priority Data

Feb. 15, 1991 [JP] Japan ................................ 3-021991
Mar. 18, 1991 [JP] Japan ................................ 3-051880

[51] Int. Cl.⁶ ............................................. B29D 23/00
[52] U.S. Cl. .............................. 428/36.92; 264/523
[58] Field of Search ............................. 525/240; 526/351, 526/348, 348.1; 428/35.7, 36.92; 264/523, 524, 525, 526, 528, 529, 530, 531–543

[56] References Cited

U.S. PATENT DOCUMENTS

| | | | |
|---|---|---|---|
| 3,835,201 | 9/1974 | Fischer | 260/897 |
| 4,368,280 | 1/1983 | Yui et al. | 523/211 |
| 4,522,982 | 6/1985 | Ewen | 525/240 |
| 4,892,851 | 1/1990 | Ewen et al. | 502/104 |
| 5,073,420 | 12/1991 | Yano et al. | 428/35.7 |
| 5,132,381 | 7/1992 | Winter et al. | 526/160 |

FOREIGN PATENT DOCUMENTS

| | | |
|---|---|---|
| 0373660 | 6/1990 | European Pat. Off. |
| 0405201 | 1/1991 | European Pat. Off. |
| 53-5379939 | 7/1978 | Japan . |
| 85190017 | 2/1991 | Japan . |

*Primary Examiner*—James J. Seidleck
*Assistant Examiner*—Michael A. Williamson
*Attorney, Agent, or Firm*—Burns, Doane, Swecker & Mathis

[57] ABSTRACT

A molded article obtained by blow molding a propylene having a substantially syndiotactic structure or a resin composition comprising a polypropylene having a substantially syndiotactic structure and a copolymer of ethylene and propylene, and a multi-layer molded article obtained from this resin composition in which at least one surface of the molded article is a polypropylene layer having the substantially syndiotactic structure.

11 Claims, No Drawings

TRANSPARENT IMPACT-RESISTANT MOLDED ARTICLES

This application is a continuation of application Ser. No. 07/831,519, filed Feb. 5, 1992, now abandoned.

BACKGROUND OF THE INVENTION (i) Field of the Invention

The present invention relates to molded articles of a polypropylene which are transparent and excellent in impact resistance. More specifically, it relates to transparent and impact-resistant molded articles obtained by blow molding a polypropylene having a substantially syndiotactic structure, or a composition comprising a polypropylene having a substantially syndiotactic structure and a copolymer of ethylene and propylene as well as transparent multi-layer molded articles having good impact-resistance which are obtained from the above-mentioned composition and in which at least one surface of each article has a polypropylene layer having a substantially syndiotactic structure.

(ii) Description of the Prior Art

A syndiotactic polypropylene has been known for a long period of time. However, a polypropylene obtained by polymerization at a low temperature in the presence of a conventional catalyst comprising a vanadium compound, an ether and an organic aluminum compound is poor in syndiotacticity. Therefore, the thus prepared polypropylene is hardly considered to have characteristics of the syndiotactic polypropylene, and much less, a copolymer of ethylene and propylene which can be obtained by the use of the above-mentioned catalyst is scarcely regarded as a crystalline polypropylene.

On the contrary, a polypropylene having good tacticity, i.e., a syndiotactic pentad fraction of more than 0.7 has been discovered for the first time by J. A. Ewen et al. which can be obtained by the use of a catalyst comprising a transition metal compound having asymmetric ligands and an aluminoxane (J. Am. Chem. Soc., 110, 6255–6256, 1988).

Molded articles which can be prepared by molding a syndiotactic polypropylene obtained by the above-mentioned J. A. Ewen et al. method have good transparency and relatively excellent stiffness, but they have the problem that their impact resistance at low temperatures is bad.

On the other hand, an isotactic polypropylene is inexpensive and good in heat resistance, and therefore it can be blow molded to manufacture bottles and the like.

However, molded articles made from the isotactic polypropylene have good heat resistance, but they are poor in transparency and bad in impact resistance at low temperatures. Thus, for the purpose of improving the impact resistance at the low temperatures, a block copolymer with ethylene can be used, but in this case, there is the problem that its transparency is impaired.

SUMMARY OF THE INVENTION

An object of the present invention is to provide molded articles of a polypropylene having good transparency and excellent impact resistance.

Another object of the present invention is to provide blow molded articles of a polypropylene which are excellent in transparency and impact resistance.

Still another object of the present invention is to provide multi-layer molded articles of a polypropylene which are excellent in transparency, impact resistance and surface hardness.

The other objects of the present invention will be apparent from description given hereinafter.

The above-mentioned objects of the present invention have been achieved by the following molded articles of a polypropylene:

Transparent impact-resistant molded articles obtained by blow molding a polypropylene having a substantially syndiotactic structure, or a resin composition containing a polypropylene having a substantially syndiotactic structure and a copolymer of ethylene and propylene.

Transparent and impact-resistant multi-layer molded articles having good stiffness which is obtained from a resin composition containing a polypropylene having a substantially syndiotactic structure and a copolymer of ethylene and propylene, at least one surface of each article being a layer of the polypropylene having the substantially syndiotactic structure.

DESCRIPTION OF THE PREFERRED EMBODIMENTS

A polypropylene having a substantially syndiotactic structure can be obtained by, for example, the above-mentioned Ewen et al. method. A suitably usable catalyst is a catalyst system comprising a transition metal compound having asymmetric ligands such as isopropyl(cyclopentadienyl-1-fluorenyl)hafnium dichloride or isopropyl (cyclopentadienyl-1-fluorenyl)zirconium dichloride and an aluminoxane which are disclosed in the above-mentioned J. A. Ewen et al. literature. An example of the aluminoxane is what is obtained by condensing an alkylaluminum with water to have a polymerization degree of preferably 5 or more, and more preferably 10 or more. Methylaluminoxane having the above polymerization degree is preferably used.

Another catalyst having a structure which is different from that of the above-mentioned catalyst can also be utilized in the present invention, so long as it can provide a homopolymer having a relatively high tacticity, i.e., a syndiotactic pentad fraction of 0.7 or more when used to prepare the homopolymer of propylene [A. Zambelli et al., Macromolecules, 6, 925 (1973) and ibid., 8, 687 (1975)]. For example, a catalyst comprising a transition metal compound having asymmetric ligands and a organic aluminum compound is effective.

The amount of the aluminoxane is from 10 to 1,000,000 mole times, particularly from 50 to 5,000 mole times as much as that of the transition metal compound having the asymmetric ligands. Furthermore, in the case that the organic aluminum compound is used, the amount of this compound is preferably from 0.1 to 100,000 mole times, more preferably from 1 to 10,000 mole times as much as that of the transition metal compound.

No particular restriction is put on a polymerization process, and there can be utilized a solvent polymerization process using an inert solvent, a bulk polymerization process in which there is substantially no inert solvent, or a gas phase polymerization process.

Usually, the polymerization temperature is from $-100°$ to $200°$ C. and the polymerization pressure is from atmospheric pressure to 100 $kg/cm^2$ (gauge pressure). Preferably, the temperature is from $-100°$ to $100°$ C. and the pressure is from atmospheric pressure to 50 $kg/cm^2$ (gauge pressure).

Propylene can be polymerized alone or copolymerized with 10% or less of ethylene or an $\alpha$-olefin having 4 or more carbon atoms, preferably 4 to 20 carbon atoms such as butene-1, pentene-1, hexene-1, heptene-1 or 4-methylpentene-1. When the ratio of the above-mentioned ethylene or α-olefin is in excess of 10% by weight, the characteristics of molded articles obtained from this copolymer, or the resin composition containing the ethylene-propylene copolymer deteriorates unpreferably.

In the case that the polypropylene having a substantially syndiotactic structure is a homopolymer of propylene, its syndiotactic pentad fraction preferably is 0.6 or more, more preferably 0.7 or more. When the pentad fraction is 0.6 or less, characteristics of the crystalline polypropylene are not sufficient and physical properties are unpreferably poor.

In the case of the copolymer of propylene and ethylene or the other α-olefin, the copolymer is such that in the absorption spectrum of $^{13}$C-NMR measured in a 1,2,4-trichlorobenzene solution, a peak intensity observed at about 20.2 ppm is 0.3 or more, preferably 0.5 or more of a peak intensity attributed to all the methyl groups of the propylene unit. When this ratio is 0.3 or less physical properties are unpreferably poor.

The molecular weight of the polypropylene having the substantially syndiotactic structure is such that its intrinsic viscosity measured in a tetrahydronaphthalene solution at 135° C. is from 0.1 to 20, preferably from 0.5 to 5 about 10.0.

The ethylene-propylene copolymer preferably contains 10 to 95% by weight of ethylene. When the copolymer having an ethylene content outside this range is blended with the polypropylene having a substantially syndiotactic structure, the improvement effect of impact resistance cannot be obtained. Above all, the ethylene content is preferably from 15 to 90% by weight. In this copolymer, 50% or less of ethylene can be replaced with α-olefin having 4 or more carbon atoms.

The above-mentioned copolymer preferably has a glass transition temperature of −10° C. or less, more preferably −20° C. or less. An particularly preferable example of the copolymer is such a copolymer as to be sufficiently compatible with the polypropylene having a substantially syndiotactic structure or such a copolymer as to be dispersible as fine particles in the syndiotactic propylene. The above-mentioned sufficiently compatible copolymer has propylene chains in a racemic state. The degree of this racemic state can be represented by a racemic fraction of a serial of 2 or 3 propylene monomers, when 6 monomer units in the polymer chain are observed, and this structure can be elucidated by $^{13}$C-NMR. For example, this detail has been reported in Asakura et al.[Polymer, 129, 2208 (1988)]. Furthermore, the above-mentioned copolymer which is dispersible as fine particles preferably has a relatively low melt viscosity and is dispersible in the state of fine particles smaller than the wave length of visible light when mixed.

Such a copolymer can be prepared by the use of a certain kind of catalyst such as a titanium compound-containing catalyst, a vanadium compound-containing catalyst or a metallocene-containing catalyst. The copolymer is also commercially available under various trademarks.

The molecular weight of this copolymer is such that its intrinsic viscosity measured in a tetrahydronaphthalene solution at 135° C. is preferably from 0.1 to 20, more preferably from 0.5 to 10.

In the resin composition comprising the polypropylene having a substantially syndiotactic structure and the copolymer of ethylene and propylene, the weight ratio of the polypropylene to the copolymer is preferably not less than 30/70, more preferably not less than 45/55, and the upper limit of the weight ratio is preferably 99/1.

When the above-mentioned weight ratio is less than 30/70, the molded articles obtained from such a resin composition are poor in stiffness.

When the upper limit of the weight ratio is in excess of 99/1, the molded articles obtained from such a resin composition scarcely exert the improvement effect of impact resistance, and the impact resistance of these molded articles is substantially equal to that of molded articles obtained from the polypropylene having a syndiotactic structure.

The particularly preferable weight ratio is present in the range of from 55/45 to 98/2.

The resin composition which can be used in the present invention can be prepared by mixing the polypropylene having the substantially syndiotactic structure and the copolymer of ethylene and propylene in the above-mentioned ratio by the use of a kneader which can achieve good mixing. Alternatively, the resin composition can be obtained by the so-called block copolymerization process which comprises first polymerizing propylene to form the polypropylene having a substantially syndiotactic structure, and then copolymerizing ethylene and propylene in this polymerization system. A method which can provide better results comprises vigorously kneading the copolymer having racemic propylene chains with the polypropylene having the substantially syndiotactic structure.

As the above-mentioned kneader, there can be used a kneader which can carry out relatively vigorous kneading, for example a twin-screw extruder or a Bumbury's kneader. A kneading temperature is preferably from 150° to 350° C., more preferably 180° to 300° C. In the case that the copolymer in which the propylene chain is racemic is kneaded with the polypropylene having the substantially syndiotactic structure so as to obtain the good results, a glass transition temperature is measured by analyzing dynamic viscoelasticity, and the kneading operation should be carried out until the transition attributed to the ethylene-propylene copolymer is not observed any more. Here, the observation of no transition means that a peak of tan δ attributed to the copolymer of ethylene and propylene decreases to about ⅓ of a value before the kneading, when the measurement is made by a dynamic mechanical thermal analysis.

The thus obtained resin composition, or a polypropylene having a substantially syndiotactic structure is then blow molded. In the present invention, any blow molding process can be employed, so long as it basically comprises the steps of forming a parison, feeding the same to a mold, injecting compressed air or the like thereinto, and then blowing it. Particularly, with regard to the formation of the parison, various improved processes are known, and they can be employed in the present invention. For example, there are a process of molding the material into a cylindrical form by extrusion molding, and then blowing it; a process of cooling and cutting the cylindrical material, and then heating and blowing it; and a process of molding the material into a cylindrical form by injection molding, and then blowing it.

The molded articles which are obtained from the resin composition comprising the polypropylene having the substantially syndiotactic structure and the copolymer of ethylene and propylene are excellent in impact resistance at low temperatures, but they have the problem that surface hardness is slightly poor. This problem can be solved by allowing at least one surface of the molded article from the above-mentioned resin composition to be made from the polypropylene having the substantially syndiotactic structure.

No particular restriction is put on a method for preparing such multi-layer molded articles, and a suitable method such as multi-layer blow molding, multi-layer injection molding or multi-layer extrusion can be employed. Here, it is important that the surface on which hardness is required is made from the polypropylene having the substantially syndiotactic structure. A particularly preferable example of the polypropylene having the substantially syndiotactic structure is a propylene homopolymer having such a structure.

The thickness ratio of the layer of the above-mentioned resin composition to the layer of the polypropylene is preferably in the range of from 1/1 to 1/0.001, more preferably from 1/0.5 to 1/0.05 in view of the improvement of the impact resistance at low temperatures.

In the case of molded articles such as bottles which can be obtained by blow molding, only the outer layers of these molded articles may be made from the polypropylene having the substantially syndiotactic structure and the inner portions thereof may be free from the polypropylene layer having the substantially syndiotactic structure.

The molded articles according to the present invention are excellent in transparency and luster regarding appearance, and they are also excellent in impact resistance. In addition, they are also excellent in surface hardness, if they are prepared in the form of multilayer molded articles.

The present invention will be described in reference to examples and comparative examples. It should be noted that the scope of the present invention is not limited to these examples.

In the examples, G at the rear of pressure values represents a gauge pressure, and wt. % means % by weight.

EXAMPLE 1

(a) 15 mg of isopropyl(cyclopentadienyl-1-fluorenyl) zirconium dichloride and 2 g of methylaluminoxane (polymerization degree 16.1) made by Toso Akzo Co., Ltd were dissolved in 3 liters of toluene in a 7-liter autoclave. This isopropyl(cyclopentadienyl-1-fluorenyl)zirconium dichloride was obtained by converting, into a lithium salt, isopropylcyclopentadienyl-1-fluorene synthesized in an ordinary manner, reacting the same with zirconium tetrachloride, and then recrystallizing the resultant reaction product. Afterward, propylene was fed to the autoclave at 20° C., until a pressure of 4 kg/cm$^2$-G was attained, and polymerization was then carried out for 1 hour, while propylene was additionally fed so as to keep up 4 kg/cm$^2$-G. Next, propylene was purged from the autoclave, until 0.5 kg/cm$^2$-G was attained. A part of the resultant slurry was sampled, filtered, and then dried to obtain a polymer, and this polymer was dissolved in 1,2,4-trichlorobenzene and then analyzed by $^{13}$C-NMR. As a result, the ratio of syndiotactic pentad was 0.93.

(b) Ethylene was added to the autoclave so as to be 3 kg/cm$^2$-G, and polymerization was then carried out for 20 minutes. After completion of the polymerization, the unreacted monomer was purged, and the resulting polymerization mixture was filtered to obtain a powder. This powder was washed 5 times with 1 liter of hexane every time, and then dried at 80° C. under reduced pressure to obtain 220 g of a polymer. Afterward, this polymer was analyzed by $^{13}$C-NMR, and as a result, the content of ethylene in the polymer was 12.4 wt. %, and the ratio of the syndiotactic pentad was 0.78. Furthermore, an intrinsic viscosity (hereinafter referred to as "η") measured in a tetrahydronaphthalene solution at 135° C. was 1.24, and a ratio of the weight average molecular weight to the number average molecular weight of the polymer (hereinafter referred to as "MW/MN") measured in a 1,2,4-trichlorobenzene solution at 135° C. was 6.7. The ratio of the ethylene-propylene copolymer to the total polymer was calculated from concentrations of the slurries before and after the commencement of the copolymerization of ethylene and propylene, and as a result, this ratio was 32 wt. %. In consequence, it can be presumed that the ethylene content in the copolymer was 41 wt. %.

(c) The thus obtained polymer was further kneaded at 210° C. by means of an extruder having a cylinder diameter of 30 mm made by Ikegai Iron Works, Ltd., and it was then molded at a parison molding temperature of 195° C. and at a mold temperature of 20° C. at the time of blowing by a blow molding machine made by Placo Co., Ltd. to prepare a blown bottle of an internal volume of 750 ml. For the thus molded article, haze (%) was measured in accordance with ASTM D1003, and Izod impact strength (kg.cm/cm) was measured in accordance with ASTM D256 (23° C., -10° C.,) for samples which were prepared by cutting the blown bottle. As a result, Metsuke (the weight of the blown bottle) was 41 g, the haze was 12.4%, and the Izod impact strength was 58 and 49 kg.cm/cm, respectively.

EXAMPLE 2

(a) Propylene was polymerized by the same procedure as in Example 1 (a) to obtain a polymer having η of 1.38, a syndiotactic pentad ratio of 0.93, and MW/MN of 2.1. Next, this polymer was molded in the same molding manner as in Example 1 (c) to obtain a blown bottle. Physical properties of this blown bottle were as follows: Metsuke was 37 g, haze was 10.8%, and Izod impact strength was 58 and 3.5 kg.cm/cm, respectively.

(b) A catalyst obtained in Example 1 (a) was used, and propylene was fed to an autoclave until 0.5 kg/cm$^2$ (gauge) was attained and ethylene was fed thereto until 3 kg/cm$^2$ was attained. Polymerization was then carried out to prepare a copolymer of ethylene and propylene. η of this copolymer was 0.88, and an ethylene content was 45 wt. %.

(c) 30 parts by weight of this copolymer were mixed with 70 parts by weight of syndiotactic polypropylene obtained in the above-mentioned paragraph (a) by the use of the same extruder and in the same manner as used in Example 1 (c) to obtain a composition. Next, this composition was molded into a blown bottle. With regard to physical properties of this blown bottle, Metsuke was 42 g, haze was 12.1%, and Izod impact strength was 58 and 59 kg.cm/cm, respectively.

EXAMPLE 3

70 parts by weight of a polymer obtained in Example 2 (a) were mixed with 30 parts by weight of Tafmer (trademark) SP0370 (η was 1.41, and an ethylene content was 70.6 wt. %) made by Mitsui Petrochemical Industries, Ltd. which was a random copolymer of ethylene and propylene in the same manner as in Example 2 (a) to obtain a composition. Next, this composition was molded into a blown bottle in the same manner as in Example 1. With regard to physical properties of this blown bottle, Metsuke was 49 g, haze was 13.1%, and Izod impact strength was 61 and 63 kg.cm/cm, respectively.

COMPARATIVE EXAMPLE 1

A commercially available isotactic polypropylene (MJS 5.1 made by Mitsui Toatsu Chemicals, Inc; a random copolymer of propylene and ethylene having an ethylene content of 4.9 wt. % and a melt index of 1.5 g/minute) was blow molded in the same manner as in Example 1 (c). Physical properties of the thus molded article were as follows: Metsuke was 69 g, haze was 51.5%, and Izod impact strength was 48 and 2.8 kg.cm/cm, respectively.

EXAMPLES 4 TO 7 AND COMP. EXAMPLE 2

A syndiotactic polypropylene obtained in Example 2 (a) was kneaded with an ethylene-propylene copolymer obtained in Example 2 (b) in ratios shown in Table 1 in the same manner as in Example 1 (c), followed by blow molding in the same manner as in Example 1 (c). For the thus obtained blown bottles, physical properties were measured. The results are set forth in Table 1. In this connection, the composition of Comparative Example 2 could not be molded.

EXAMPLE 12

A polymer obtained in Example 1 (b) was kneaded in the same manner as in Example 1 (c), and the polymer was then blow molded at a parison molding temperature of 195° C. and at a blow mold temperature of 20° C. by the use of a multi-layer blow molding machine made by Placo Co., Ltd., an outer layer of an article to be molded being made from a syndiotactic polypropylene obtained in Example 2 (a), and an inner layer being made from the above-mentioned polymer. With regard to physical properties of the thus obtained blown bottle of an internal volume of 750 ml, Metsuke was 41 g, haze was 12.4%, Izod impact strength was 58 and 49 kg.cm/cm, respectively, and surface hardness was 51 gf. Furthermore, according to observation and calculation of a sectional view of a specimen prepared by cutting the bottle, the thickness of the outer layer was 0.15 mm, and that of the inner layer was 0.6 mm.

In addition, for the blown bottle obtained in Example 1, surface hardness was measured. As a result, it was 23 gf.

EXAMPLE 13

30 parts by weight of an ethylene-propylene copolymer obtained in Example 2 (b) were kneaded with 70 parts by weight of a syndiotactic polypropylene obtained in Example 2 (a) in the same manner as in Example 1 (c), thereby

TABLE 1

| Example or Comparative Example | Syndiotactic Polypropylene (pts. wt.) | Ethylene-Propylene Copolymer (pts. wt.) | Physical Properties of Molded Articles | | | |
|---|---|---|---|---|---|---|
| | | | Metsuke (g) | Haze (%) | Izod Impact Strength (kg · cm/cm) | |
| | | | | | 23° C. | −10° C. |
| Comp. Ex. 2 | 20 | 80 | — | — | — | — |
| Example 4 | 45 | 55 | 48 | 14.5 | 58 | 65 |
| Example 5 | 80 | 20 | 43 | 12.3 | 61 | 55 |
| Example 6 | 90 | 10 | 40 | 11.5 | 59 | 35 |
| Example 7 | 98 | 2 | 39 | 11.5 | 59 | 21 |

EXAMPLES 8 TO 11 AND COMP. EXAMPLE 3

Ethylene-propylene copolymers having ethylene contents shown in Table 2 were prepared in accordance with the procedure of Example 2 (b). Each copolymer was kneaded with a syndiotactic polypropylene obtained in Example 2 (a) in a ratio of 50/50 in the same manner as in Example 1 (c), followed by blow molding in the same manner as in Example 1 (c). Physical properties of the thus obtained blown bottles are shown in Table 2.

obtaining a resin composition. This resin composition was then molded in the same manner as in Example 12 to obtain a blown bottle, the inner layer of this bottle being made from the above-mentioned resin composition. With regard to physical properties of the thus obtained blown bottle, Metsuke was 42 g, haze was 12.1%, Izod impact strength was 58 and 59 kg.cm/cm, respectively, and surface hardness was 51 gf. In this bottle, the thickness of the outer layer was 0.2 mm, and that of the inner layer was 0.6 mm.

TABLE 2

| Example or Comparative Example | Ethylene Content in Ethylene-Propylene Copolymer (%) | Physical Properties of Molded Articles | | | |
|---|---|---|---|---|---|
| | | Metsuke (g) | Haze (%) | Izod Impact Strength (kg · cm/cm) | |
| | | | | 23° C. | −10° C. |
| Example 8 | 10 | 41 | 11.0 | 61 | 41 |
| Example 9 | 30 | 42 | 12.7 | 59 | 52 |
| Example 10 | 60 | 43 | 11.5 | 61 | 59 |
| Example 11 | 95 | 46 | 14.5 | 59 | 45 |
| Comp. Ex. 3 | 98 | 45 | 25.3 | 59 | 32 |

EXAMPLE 14

The same procedure as in Example 12 was effected except that a resin composition in Example 3 was used as an inner layer, thereby molding a multi-layer blown bottle. With regard to physical properties of the thus molded blown bottle, Metsuke was 49 g, haze was 13.1%, and Izod impact strength was 61 and 63 kg.cm/cm. In this bottle, the thickness of the outer layer was 0.2 mm and that of the inner layer was 0.65 mm, and surface hardness was 53 gf.

COMPARATIVE EXAMPLE 4

For a blown bottle made from an isotactic polypropylene in Comparative Example 1, surface hardness was measured. As a result, it was 60 gf.

In a resin composition which can be used in the present invention, various usual additives can be contained which are, for example, an antioxidant, an ultraviolet absorber, an antiblocking agent, a slip agent and a nucleating agent.

Examples of multi-layer molded articles in which at least one surface is made from the polypropylene having a substantially syndiotactic structure include various molded articles such as plates, extruding materials, sheets, films and pipes, in addition to the blown bottles shown in the above-mentioned examples.

What is claimed is:

1. A transparent impact-resistant blow-molded article comprising (a) a syndiotactic propylene homopolymer which has a syndiotactic pentad fraction of 0.7 or more and an intrinsic viscosity of from 0.5 to 10 measured in a tetrahydronaphthalene solution at 135° C., (b) a syndiotactic propylene copolymer which contains 10% by weight or less of ethylene or α-olefin units having 4 to 20 carbon atoms, and wherein a peak intensity observed at about 20.2 ppm in the absorption spectrum of $^{13}$C-NMR measured in a 1,2,4-trichlorobenzene solution of the polypropylene is 0.5 or more of a peak intensity attributed to all the methyl groups of the propylene unit, or (c) a resin composition containing the syndiotactic propylene homopolymer or the syndiotactic propylene copolymer and an ethylene-propylene copolymer having an ethylene content of 10 to 95% by weight, the amount of the syndiotactic polymer or copolymer being from about 30% by weight to about 99% by weight of the resin composition.

2. The blow-molded article according to claim 1 wherein the content of the syndiotactic propylene homopolymer or the syndiotactic propylene copolymer is from about 45% by weight to about 99% by weight of the resin composition.

3. The blow-molded article according to claim 1 wherein the content of the syndiotactic propylene homopolymer or the syndiotactic propylene copolymer is from about 55% by weight to about 98% by weight of the resin composition.

4. The blow-molded article according to claim 1 wherein an ethylene content in the ethylene-propylene copolymer is from 15% by weight to 90% by weight of the copolymer.

5. The blow-molded article according to claim 1 in which the glass transition temperature of the ethylene-propylene copolymer is −10° C. or less, and the ethylene-propylene copolymer is sufficiently compatible with the syndiotactic propylene homopolymer or the syndiotactic propylene copolymer or dispersible as fine particles in the syndiotactic propylene homopolymer or the syndiotactic propylene copolymer, and has an intrinsic viscosity of from 0.5 to 10 measured in a tetrahydronaphthalene solution at 135° C.

6. The blow-molded article according to claim 1 which is a monolayer blow-molded bottle.

7. A transparent and impact resistant blow-molded monolayer resin bottle comprising (a) a syndiotactic propylene homopolymer which has a syndiotactic pentad fraction of 0.7 or more and an intrinsic viscosity of from 0.5 to 10 measured in a tetrahydronaphthalene solution at 135° C., or (b) a syndiotactic propylene copolymer which contains 10% by weight or less of ethylene or α-olefin units having 4 to 20 carbon atoms, and wherein a peak intensity observed at about 20.2 ppm in the absorption spectrum of $^{13}$C-NMR measured in a 1,2,4-trichlorobenzene solution of the polypropylene is 0.5 or more of a peak intensity attributed to all the methyl groups of the propylene unit.

8. A transparent and impact resistant blow-molded monolayer resin bottle comprising a resin composition containing a syndiotactic propylene homopolymer or a syndiotactic propylene copolymer and an ethylene-propylene copolymer, said syndiotactic propylene homopolymer having a syndiotactic pentad fraction of 0.7 or more and an intrinsic viscosity of from 0.5 to 10 measured in a tetrahydronaphthalene solution at 135° C., said syndiotactic propylene copolymer containing 10% by weight or less of ethylene or α-olefin units having 4 to 20 carbon atoms, and a peak intensity observed at about 20.2 ppm in the absorption spectrum of $^{13}$C-NMR measured in a 1,2,4-trichlorobenzene solution of said propylene copolymer being 0.5 or more of a peak intensity attributed to all the methyl groups of the propylene unit, and said ethylene-propylene copolymer containing 10 to 95% by weight of ethylene and having a glass transition temperature of −10° C. or less and being sufficiently compatible with said syndiotactic propylene homopolymer or copolymer or dispersible as fine particles in said propylene homopolymer or copolymer and having an intrinsic viscosity of from 0.5 to 10 measured in a tetrahydronaphthalene solution at 135° C., the content of the syndiotactic propylene homopolymer or copolymer being from about 30% by weight to about 99% by weight of the resin composition.

9. A monolayer resin bottle as claimed in claim 8 wherein the content of the syndiotactic propylene homopolymer or the syndiotactic propylene copolymer is from about 45% by weight to about 99% by weight.

10. A monolayer resin bottle as claimed in claim 8 wherein the content of the syndiotactic propylene homopolymer or the syndiotactic propylene copolymer is from about 55% by weight to about 98% by weight.

11. A monolayer resin bottle as claimed in claim 8 wherein the ethylene content in the ethylene-propylene copolymer is from 15% by weight to 90% by weight of the copolymer.

* * * * *